US009615125B2

(12) United States Patent
Taylor et al.

(10) Patent No.: US 9,615,125 B2
(45) Date of Patent: Apr. 4, 2017

(54) METHOD OF DATA MANAGEMENT FOR EFFICIENTLY STORING AND RETRIEVING DATA TO RESPOND TO USER ACCESS REQUESTS

(71) Applicant: Comcast IP Holdings I, LLC, Wilmington, DE (US)

(72) Inventors: Clement G. Taylor, Watertown, MA (US); Danny Chin, Princeton Junction, NJ (US); Jesse S. Lerman, New Brunswick, NJ (US); Christopher W. B. Goode, Menlo Park, CA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 0 days.

(21) Appl. No.: 14/483,760

(22) Filed: Sep. 11, 2014

(65) Prior Publication Data

US 2015/0067750 A1 Mar. 5, 2015

Related U.S. Application Data

(60) Continuation of application No. 12/708,144, filed on Feb. 18, 2010, now Pat. No. 8,875,203, which is a
(Continued)

(51) Int. Cl.
*H04N 7/173* (2011.01)
*H04N 21/432* (2011.01)
(Continued)

(52) U.S. Cl.
CPC ........... *H04N 21/432* (2013.01); *G06F 3/065* (2013.01); *G06F 3/0613* (2013.01);
(Continued)

(58) Field of Classification Search
CPC ....... H04N 21/23103; H04N 21/23106; H04N 21/432; H04N 21/23113
(Continued)

(56) References Cited

U.S. PATENT DOCUMENTS

| 5,148,432 A | 9/1992 | Gordon et al. |
| 5,473,362 A | 12/1995 | Fitzgerald et al. |

(Continued)

FOREIGN PATENT DOCUMENTS

| EP | 0658055 A1 | 6/1995 |
| JP | 2000172450 A | 6/2000 |

(Continued)

OTHER PUBLICATIONS

Communication and Supplementary European Search Report for EP02769711.9-2223 dated Feb. 11, 2010.
(Continued)

*Primary Examiner* — Olugbenga Idowu
(74) *Attorney, Agent, or Firm* — Banner & Witcoff, Ltd.

(57) ABSTRACT

A method of data management for efficiently storing and retrieving data in response to user access requests. The method includes receiving a request from at least one client for a title not resident in a storage server, where the title includes a play track having a plurality of chapters. The retrieval from a secondary storage device of play track portions proximate chapter delineation points is initiated, and bandwidth capacity and quality-of-service (QoS) parameters associated with the secondary storage device is determined. In the case of a client request to begin presentation of the title at one of the chapters, streaming of retrieved portions of the play track chapter to the client is initiated, masking latency associated with the secondary storage device is provided, and retrieval of at least unretrieved portions of the play track chapter and subsequent
(Continued)

play track portions from the secondary storage device is initiated.

20 Claims, 12 Drawing Sheets

Related U.S. Application Data division of application No. 11/168,641, filed on Jun. 27, 2005, now Pat. No. 7,882,260, which is a continuation of application No. 10/695,101, filed on Oct. 28, 2003, now Pat. No. 6,912,585, which is a continuation of application No. 09/854,839, filed on May 14, 2001, now Pat. No. 6,721,794, which is a continuation-in-part of application No. 09/283,895, filed on Apr. 1, 1999, now Pat. No. 6,233,607.

(51) Int. Cl.
*G06F 3/06* (2006.01)
*G06F 9/50* (2006.01)
*G06F 11/20* (2006.01)
*G06F 17/30* (2006.01)
*H04N 21/222* (2011.01)
*H04N 21/231* (2011.01)
*H04N 21/258* (2011.01)
*H04N 21/845* (2011.01)
*H04N 21/438* (2011.01)
*H04N 21/6587* (2011.01)
*G06F 11/16* (2006.01)
*H04L 29/08* (2006.01)

(52) U.S. Cl.
CPC .......... *G06F 3/0635* (2013.01); *G06F 3/0683* (2013.01); *G06F 9/5016* (2013.01); *G06F 11/2094* (2013.01); *G06F 17/30138* (2013.01); *G06F 17/30194* (2013.01); *H04L 67/2852* (2013.01); *H04N 7/17318* (2013.01); *H04N 7/17336* (2013.01); *H04N 7/17354* (2013.01); *H04N 21/222* (2013.01); *H04N 21/23103* (2013.01); *H04N 21/23106* (2013.01); *H04N 21/23113* (2013.01); *H04N 21/23116* (2013.01); *H04N 21/25891* (2013.01); *H04N 21/438* (2013.01); *H04N 21/6587* (2013.01); *H04N 21/8456* (2013.01); *G06F 3/0649* (2013.01); *G06F 11/1662* (2013.01); *G06F 2206/1012* (2013.01); *H04L 67/322* (2013.01)

(58) Field of Classification Search
USPC .......................................................... 725/94
See application file for complete search history.

(56) References Cited

U.S. PATENT DOCUMENTS

| | | | |
|---|---|---|---|
| 5,606,359 A | 2/1997 | Youden et al. |
| 5,671,377 A | 9/1997 | Bleidt et al. |
| 5,864,682 A | 1/1999 | Porter et al. |
| 5,889,561 A | 3/1999 | Kwok et al. |
| 5,892,913 A | 4/1999 | Adiga et al. |
| 5,913,039 A | 6/1999 | Nakamura et al. |
| 5,915,094 A | 6/1999 | Kouloheris et al. |
| 5,918,213 A | 6/1999 | Bernard et al. |
| 5,920,700 A | 7/1999 | Gordon et al. |
| 5,933,603 A | 8/1999 | Vahalia et al. |
| 5,935,206 A | 8/1999 | Dixon et al. |
| 5,951,694 A | 9/1999 | Choquier et al. |
| 5,991,306 A | 11/1999 | Burns et al. |
| 5,996,015 A | 11/1999 | Day et al. |
| 6,006,264 A | 12/1999 | Colby et al. |
| 6,014,706 A | 1/2000 | Cannon et al. |
| 6,018,359 A * | 1/2000 | Kermode ............ H04N 21/2381 348/E5.008 |
| 6,028,725 A | 2/2000 | Blumenau |
| 6,047,309 A | 4/2000 | Dan et al. |
| 6,047,323 A | 4/2000 | Krause |
| 6,061,504 A | 5/2000 | Tzelnic et al. |
| 6,065,050 A | 5/2000 | DeMoney |
| 6,092,178 A | 7/2000 | Jindal et al. |
| 6,094,677 A | 7/2000 | Capek et al. |
| 6,112,239 A | 8/2000 | Kenner et al. |
| 6,151,634 A | 11/2000 | Glaser et al. |
| 6,178,460 B1 | 1/2001 | Maddalozzo, Jr. et al. |
| 6,223,206 B1 | 4/2001 | Dan et al. |
| 6,226,618 B1 | 5/2001 | Downs et al. |
| 6,230,200 B1 * | 5/2001 | Forecast ................... G06F 9/50 709/219 |
| 6,233,389 B1 | 5/2001 | Barton et al. |
| 6,263,411 B1 | 7/2001 | Kamel et al. |
| 6,314,456 B1 | 11/2001 | Van Andel et al. |
| 6,314,573 B1 | 11/2001 | Gordon et al. |
| 6,362,836 B1 | 3/2002 | Shaw et al. |
| 6,377,972 B1 | 4/2002 | Guo et al. |
| 6,535,920 B1 | 3/2003 | Parry et al. |
| 6,571,391 B1 | 5/2003 | Acharya et al. |
| 6,721,794 B2 | 4/2004 | Taylor et al. |
| 6,728,965 B1 | 4/2004 | Mao |
| 6,757,796 B1 | 6/2004 | Hofmann |
| 6,850,252 B1 | 2/2005 | Hoffberg |
| 6,912,585 B2 | 6/2005 | Taylor et al. |
| 7,028,096 B1 | 4/2006 | Lee |
| 7,107,606 B2 * | 9/2006 | Lee ..................... H04N 7/17336 348/E5.008 |
| 7,770,199 B2 | 8/2010 | Slater et al. |
| 2004/0098453 A1 | 5/2004 | Stern |
| 2006/0282542 A1 | 12/2006 | Pinckney et al. |

FOREIGN PATENT DOCUMENTS

WO 0059202 A2 10/2000
WO 0060481 A1 10/2000

OTHER PUBLICATIONS

Jun, et al., "Video Allocation Methods in a Multi-Level Server for Large-Scale VOD Services", IEEE Transactions on Consumer Electronics, vol. 44, No. 4, Nov. 1, 1998, pp. 1309-1318.
Oezden, et al., "On the Design of a Low-Cost Video-on-Demand Storage System", Multimedia Systems, vol. 4, No. 1, Feb. 1, 1996, pp. 40-54.
Tewari, et al., "High Availability in Clustered Multimedia Servers", Data Engineering, Feb. 26, 1996, pp. 645-654.
Buddhikot, et al., "Design of a Large Scale Multimedia Storage Server", Computer Networks and ISDN Systems, vol. 24, No. 3, Dec. 1, 1994, pp. 503-517.

* cited by examiner

METHOD OF DATA MANAGEMENT FOR EFFICIENTLY STORING AND RETRIEVING DATA TO RESPOND TO USER ACCESS REQUESTS

CROSS-REFERENCE TO RELATED APPLICATIONS

This application is a continuation of U.S. patent application Ser. No. 12/708,144, filed Feb. 18, 2010, now U.S. Pat. No. 8,875,203, which is a divisional of U.S. patent application Ser. No. 11/168,641, filed Jun. 27, 2005, now U.S. Pat. No. 7,882,260, which is a continuation of U.S. patent application Ser. No. 10/695,101, filed Oct. 28, 2003, now U.S. Pat. No. 6,912,585, which is a continuation of U.S. patent application Ser. No. 09/854,839, filed May 14, 2001, now U.S. Pat. No. 6,721,794, which is a continuation-in-part of U.S. patent application Ser. No. 09/283,895, filed Apr. 1, 1999, now U.S. Pat. No. 6,233,607. All prior applications are incorporated herein by reference.

BACKGROUND OF THE DISCLOSURE

The present invention generally relates to a modular storage server architecture for retrieving data in response to user access requests. In particular, the invention relates to a server architecture in which data is dynamically distributed over a plurality of disks, a plurality of processors are assigned to particular disks, and data access requests are assigned to particular processors in order to provide good data access performance and server fault tolerance.

A storage server allows users to efficiently retrieve information from large volumes of data stored on a plurality of disks and secondary storage (e.g., magnetic tape or an optical-disk jukebox). For example, a video server is a storage server that accepts user requests to view a particular movie from a video library, retrieves the requested program from disk, and delivers the program to the appropriate user(s). Such a video server is disclosed in U.S. Pat. No. 5,671,377, entitled "System For Supplying Streams Of Data To Multiple Users By Distributing A Data Stream To Multiple Processors And Enabling Each User To Manipulate Supplied Data Stream" issued to Bleidt et al. on Sep. 23, 1997.

The foregoing storage server employs one or more processors that access data that is stored across an array of disk drives using fault tolerant storage technique such as RAID (Redundant Array of Inexpensive Disks). While such architectures provide uniform non-blocking access to all of the data stored on the disk drives, they do not facilitate a modular architecture. Since data is striped across all of the disk drives in the array, adding or removing disk drives to/from the server requires that all of the data be re-striped across the new set of disk drives. Because the servers are not modular, it is therefore inconvenient to increase or decrease storage capacity by adding or removing disk drives.

There is therefore a need in the art for a storage server architecture that is modular and can acceptably resolve content blocking issues.

SUMMARY OF THE INVENTION

The disadvantages associated with the prior art are overcome by the present invention of a server comprising a plurality of modules, each of which contains a single processor and a cluster of, for example, 16 disk drives, and a host controller that communicates with and assigns data requests to each of the modules. Data is written to the disk drives by striping the data across the 16-disk drive cluster of a single module according to a RAID-5 protocol, with parity and spares distributed amongst the disk drives in the cluster.

The architecture of the present invention employs dynamic data management methods, which determine whether data should reside on disk or secondary storage, on which disk drives data should be stored, and how data should be replicated and/or migrated to new disk drives based on observed user access patterns. These methods also migrate popular data to faster disk tracks to reduce average access time and thus improve performance.

User access requests are assigned to modules based on the data stored at each module, and each module's current load (the number of requests waiting to be serviced). If the requested data is not on a disk drive, the data is retrieved from secondary storage, and may be stored on the disk drives for rapid subsequent access. When a requested data item on the disk drive is replicated, load balancing is performed by assigning the request to the module holding the data with the lowest load. In addition, user access requests waiting to retrieve replicated data may be dynamically and seamlessly migrated to another module based on changes in module loads.

In one embodiment, a method of data management for efficiently storing and retrieving data in response to user access requests is provided. The method includes receiving a request from at least one client for a title not resident in a storage server, where the title includes a play track having a plurality of chapters.

The retrieval from a secondary storage device of play track portions proximate chapter delineation points is initiated, and bandwidth capacity and quality-of-service (QoS) parameters associated with the secondary storage device is determined. In the case of a client request to begin presentation of the title at one of the chapters, streaming of retrieved portions of the play track chapter to the client is initiated, masking latency associated with the secondary storage device is provided, and retrieval of at least unretrieved portions of the play track chapter and subsequent play track portions from the secondary storage device is initiated.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
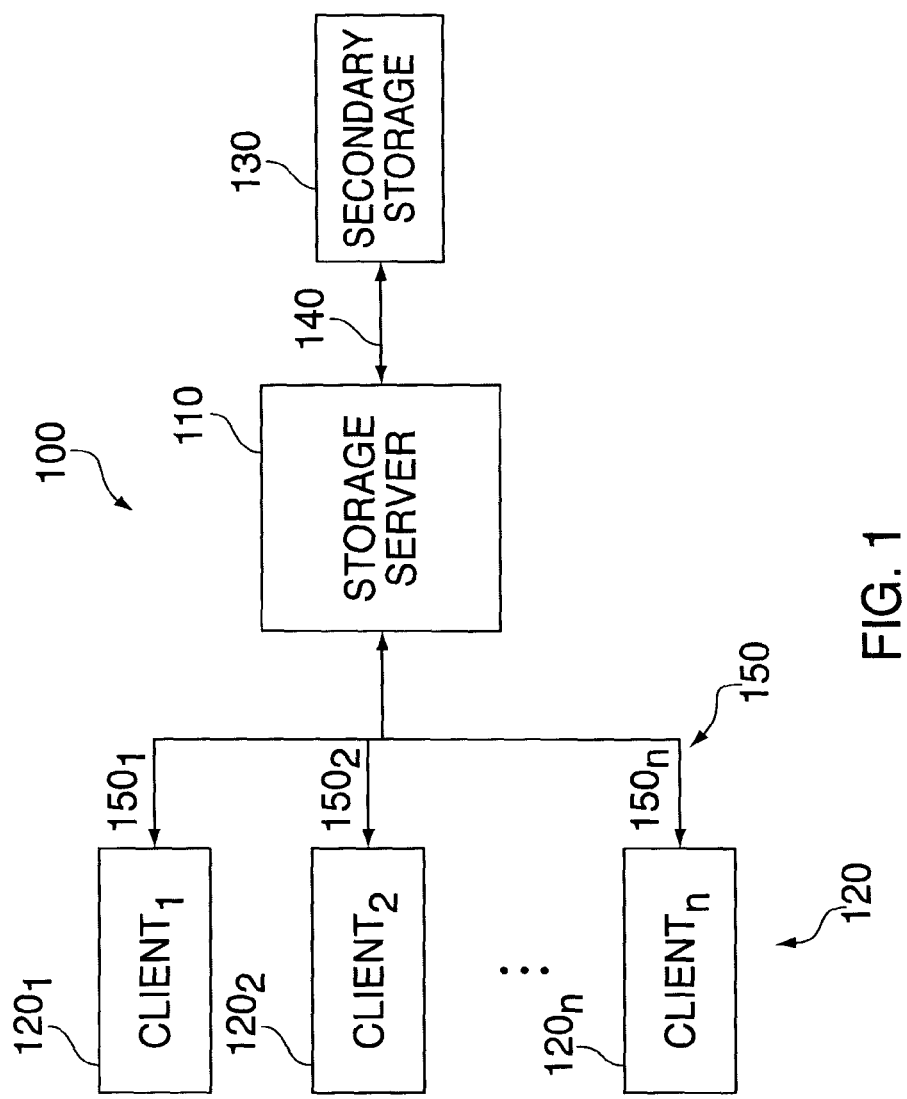
FIG. 1 depicts a high-level block diagram of a data retrieval system that includes a storage server incorporating the present invention.

FIG. 1 depicts a client/server data retrieval system 100 that employs a storage server 110 to accept user data access requests from clients $120_1, 120_2, 120_3, \ldots 120_n$ (collectively referred to as clients 120) via bi-directional data paths $150_1, 150_2, \ldots 150_n$ (collectively referred to as paths 150). Server 110 retrieves the requested data from the disk drives within the server, and, when necessary, from secondary storage 130 via bi-directional path 140, and outputs the requested data for distribution to the appropriate client(s) along data path(s) 150. A detailed description of a video-on-demand system that finds the server of the present invention particularly useful is described in commonly assigned U.S. Pat. No. 6,253,375, which is hereby incorporated by reference herein in its entirety.

Figure 2:
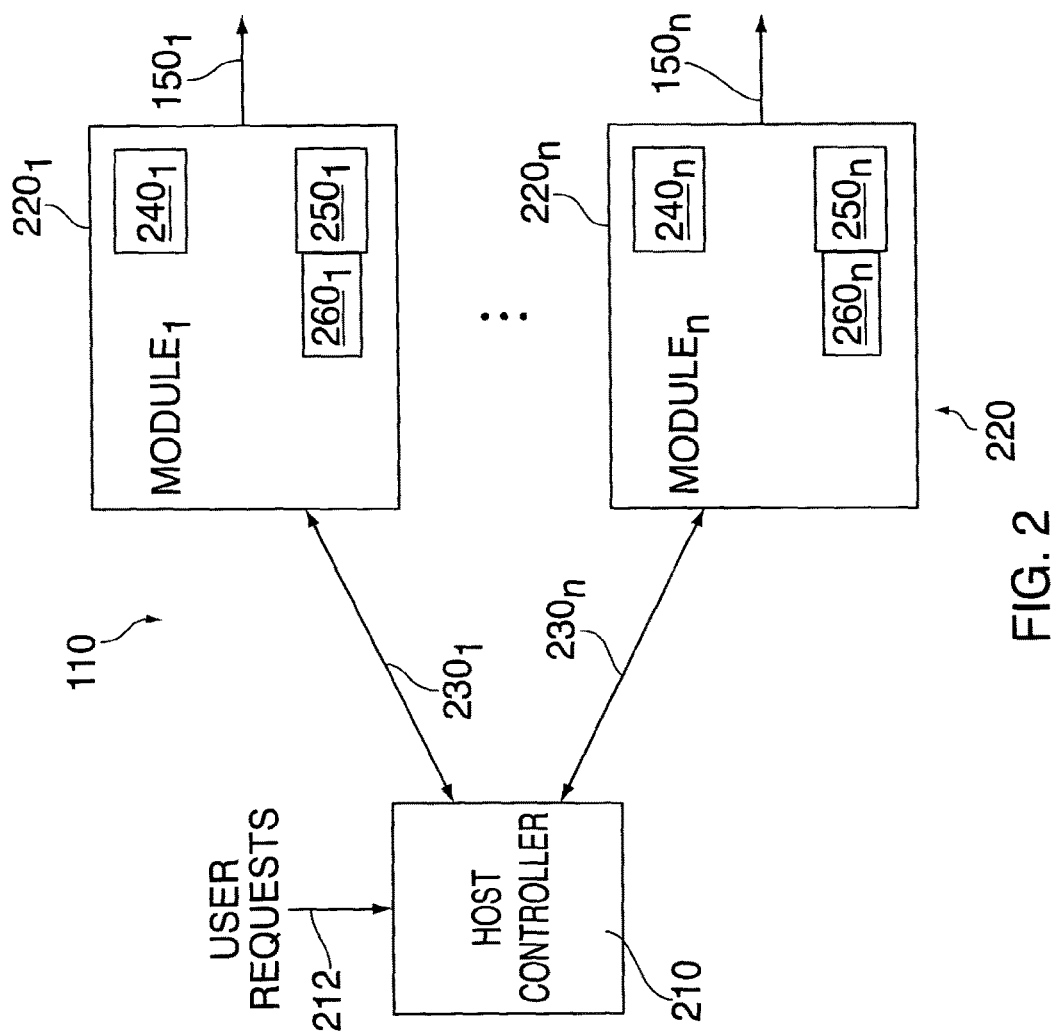
FIG. 2 depicts a detailed diagram of the architecture of the storage server.

FIG. 2 depicts a detailed diagram of the architecture of storage server 110. The storage server comprises a host controller 210 and a plurality of modules $220_1, 220_2 \ldots 220_n$ (collectively referred to as modules 220) that are coupled to the host controller by bi-directional data paths $230_1, 230_2, \ldots 230_n$ (collectively referred to as paths 230). In the preferred embodiment of the invention, data paths 230 are part of an ethernet network. Each of the modules 220 comprise a processor 240, a cluster of 16 disk drives 250, and a request queue 260 in which access requests wait to be serviced by the disk drives 250. The host controller 210 accepts incoming user access requests from data path 212, and assigns these requests to modules 220 by forwarding the requests along data paths 230.

A given data item (e.g., a video program) is stored on disk by striping the data across the 16 disk drives of one of the modules 220 according to the RAID 5 protocol. RAID 5 is well known in the art as a protocol that provides fault-tolerant error-correcting storage and retrieval on an array of disks.

A data item is therefore stored at a single module on a 16-disk drive cluster, in contrast to non-modular server architectures in which data is striped across the entire set of disk drives. In order to manage data in this modular architecture, protocols are necessary for determining which module shall store the data at any given time. In addition, it is possible in a modular architecture to store multiple copies of data within various modules, a technique known as data replication, and to dynamically migrate data from one module to another to accommodate changes in user access patterns. Finally, a substantial data library is stored in secondary storage 130, e.g., content server, a magneto-optical storage array or other form of data storage, and selected data items are recalled from secondary storage 130 stored on disk 250 at one or more modules 220 to enable rapid access of the data. As such, special data management routines are necessary to facilitate data movement from secondary storage 130 to the storage modules 220.

The Data Initialization Protocol determines which data items are retrieved from the secondary storage 130 and stored on the disk drives 250, and at which of the module(s) 220 data are stored. The basic strategy of the Data Initialization Protocol is to repeatedly retrieve the most popular data items from the secondary storage 130 and store them on the disk drives 250, until there is insufficient disk space available to hold any additional data items. At each iteration of the Data Initialization Protocol, the candidate modules 220 that have sufficient disk space to hold the data are identified, and the data is stored at the candidate module with the lowest load, where "load" refers to the total bandwidth requirement for the requests waiting in the module's queue 260. Since at initialization, no user requests have yet been submitted, each data item is assigned an initial popularity value, and the load is estimated as the sum of the popularity values of the data items already stored on the module disk drive cluster 250. By selecting the module 220 with the lowest load, the Data Initialization Protocol provides a significant load-balancing effect that keeps the popular data items evenly distributed over all the modules 220, thus enhancing the performance of the server 110.

Figure 3:
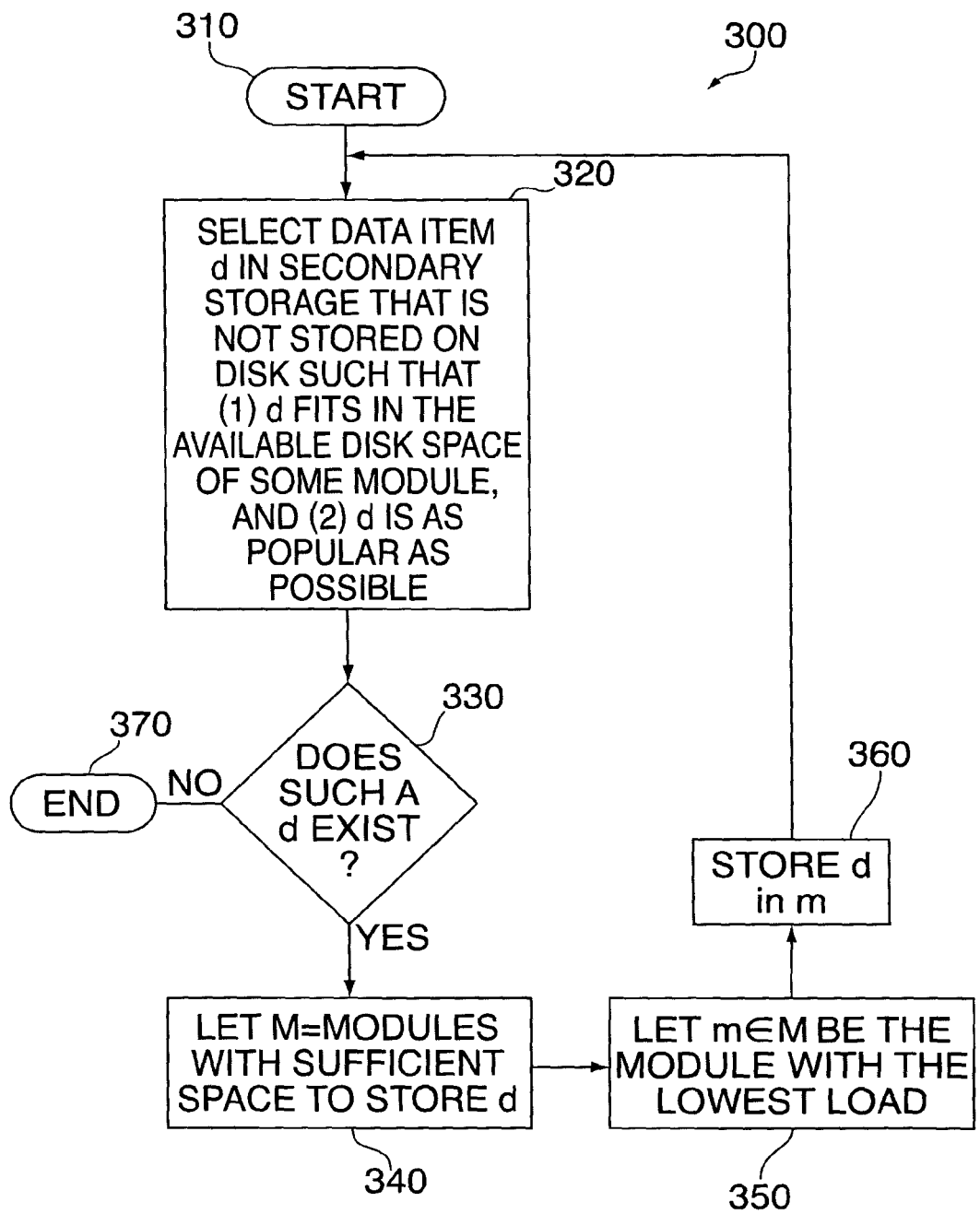
FIG. 3 depicts a flowchart specification of the Data Initialization Protocol.

FIG. 3 depicts a flow diagram of the Data Initialization Protocol 300. At each iteration of the protocol, the most popular data item in secondary storage that can fit in at least one module's 16-disk drive cluster is selected at step 320. If no such data item exists, as determined by the query at step 330, the protocol terminates at step 370; otherwise, the set of candidate modules (M) with sufficient disk space is determined at step 340. At step 350, the module (M) having the lowest present load is selected from the set of modules M having sufficient space to store data d. At step 360, the data item is then stored on the disk drive cluster of the candidate module with the lowest load and the next iteration begins at step 320.

Note that the above specification of the Data Initialization Protocol does not have any provisions for multiple copies of data items stored on the disk drives (i.e., data replication.) In some applications such as a video server; however, it is desirable to replicate frequently requested data so that these data items don't act as "bottlenecks" when a substantial number of users request the same data item concurrently. Thus, the preferred embodiment of the invention employs a more general version of the Data Initialization Protocol in which data can be stored on the disk drive clusters of multiple modules simultaneously. In this more general version of the protocol, the popularity value of a data item is an integer denoting the desired degree of replication for that data item (i.e., how many copies of the data item should be stored.) Note that multiple copies of a data item should never be stored within the same module, as this offers no performance advantage while unnecessarily consuming additional disk space.

Figure 4:
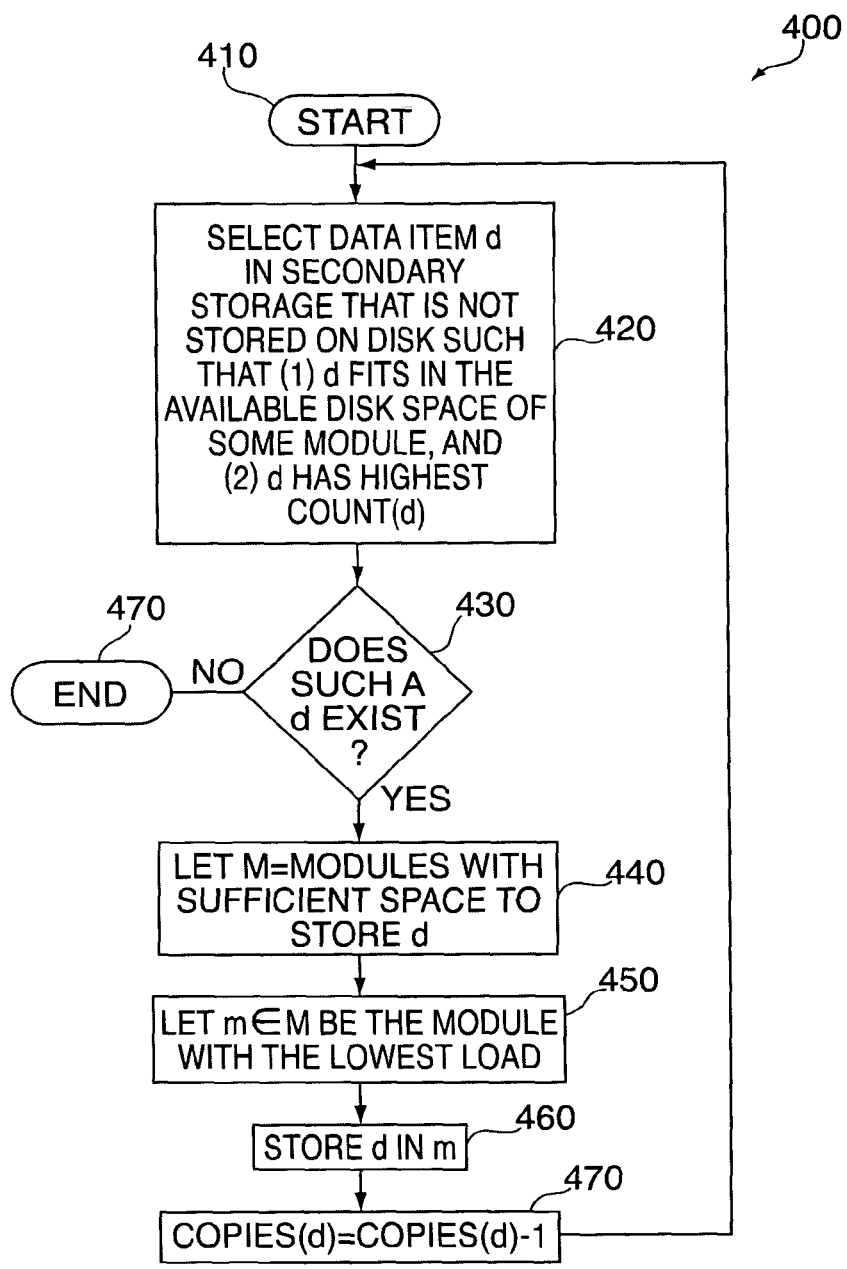
FIG. 4 depicts a flowchart specification of a more general version of the Data Initialization Protocol.

FIG. 4 depicts a flow diagram of the Data Initialization Protocol 400. At each iteration of the protocol 400, the data item with the highest replication count (denoted by copies (d)) is selected at step 420 and, as in the previous version of the protocol, this data item is stored at the module with sufficient free disk space having the lowest load as determined in steps 440, 450, and 460. After the data item is stored, the replication count copies(d) is decremented by 1, at step 470, and the next iteration begins at step 420.

When a user requests a data item that is not stored on the disk drives, the storage server retrieves the data from secondary storage, loads it onto a selected module disk drive cluster, and outputs the data for delivery to the requesting user(s). In order to determine at which disk drive cluster the data should be stored, a Data Retrieval Protocol is used. If there is no available disk space on any of the clusters, and there is at least one data item with more than a single copy on disk, the Data Retrieval Protocol will select one such data item and remove a copy from disk to make room for the new data item. The basic strategy of the Data Retrieval Protocol is to store the new data item on the least loaded module that has sufficient free disk space to accommodate the new data item. If no modules have available disk space, however, then the Data Retrieval Protocol will make room for the new data item by replacing one of the data items currently on the disk drives. Alternatively, if no free space is available, the system may send the data item to the user without storing the data item.

Selecting the data item on disk to be replaced is similar to the selection of virtual memory pages to be replaced in an operating system. The Data Retrieval Protocol borrows from two page replacement algorithms, called Least Recently Used and Not Frequently Used, which are well known in the operating system arts. Specifically, the Data Retrieval Protocol maintains a view count for each data item which indicates the number of times the data item has been requested, and a timestamp for each data item indicating the time at which the data was last requested. The protocol then identifies the set of data items which are both inactive and replicated, and from this set selects the item that has been least frequently requested (i.e., having the smallest view count), breaking ties by selecting the item that was least recently used (i.e., having the earliest timestamp). A data item is active, and thus ineligible for the aforementioned set of replacement candidates, in any one of the four following situations: (1) the data item is being read from the disk drives in response to a user access request, (2) the data item is being retrieved from secondary storage and stored on the disk drives, (3) the data item is being migrated to another module disk drive cluster, and (4) the data item is in the process of being replicated.

Figure 5:
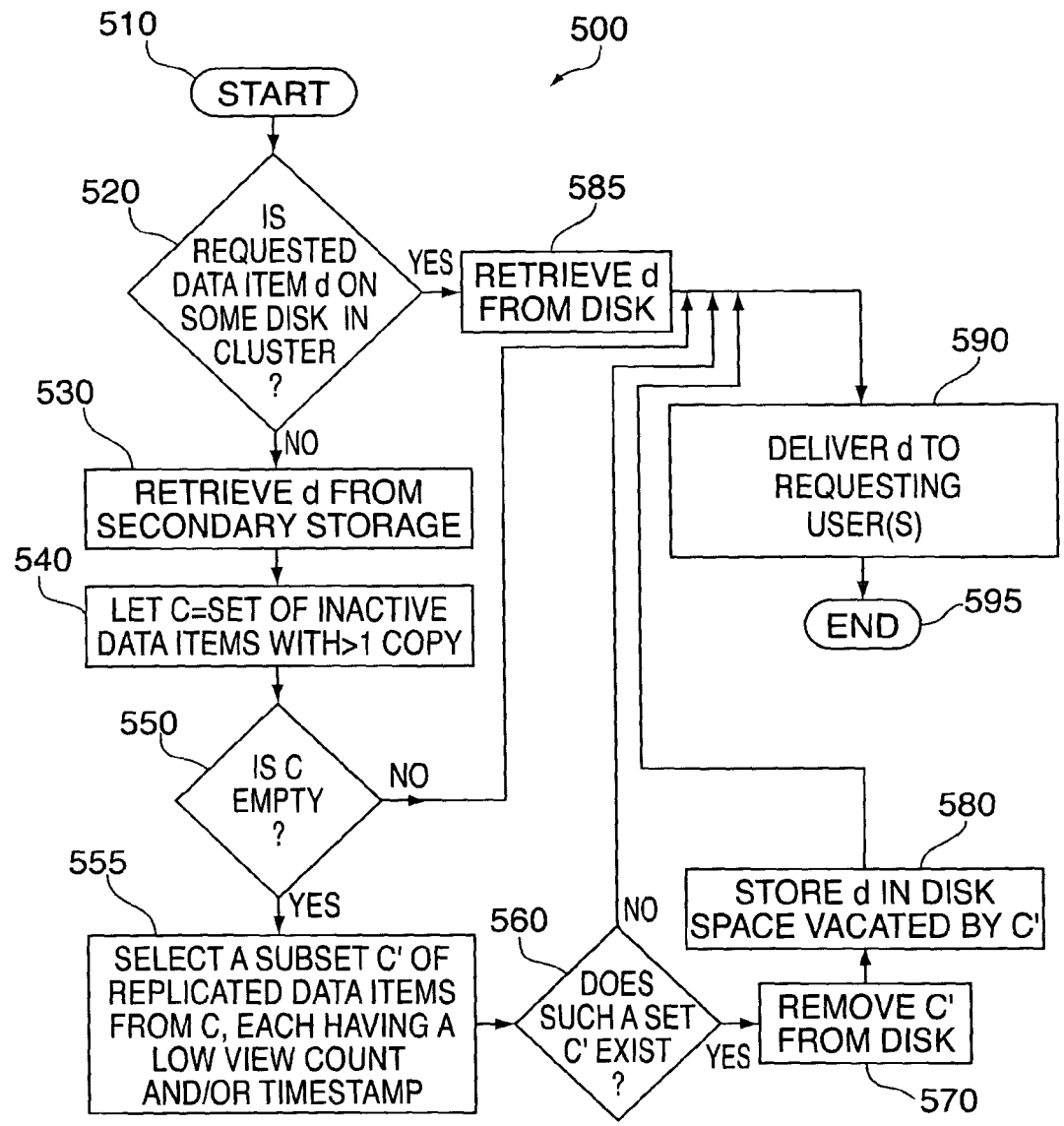
FIG. 5 depicts a flowchart specification of the Data Retrieval Protocol.

FIG. 5 depicts a flow diagram of a Data Retrieval Protocol 500. This Protocol begins at step 510 and then checks (at step 520) whether the requested data item d is stored on the disk drives, and if the data is stored on disk, the data item d is retrieved at step 585, and delivered to the requesting user at step 590. If the data is not locally available, the protocol retrieves data item d from secondary storage at step 530, and then, at step 540, determines the set C of inactive data items in the primary module 220 having more than one copy. If set C is empty as determined by the query at step 550, data item d is output from the secondary storage 130 for delivery to the requesting user(s) at step 590. Otherwise, at step 555, the protocol tries to select a subset C' of set C of data items in the same module, each having a low view count and/or timestamp. If such a subset C' does not exist as determined at step 560, data item d is forwarded to the user without being stored on the disk drives of the primary modules at step 590. Otherwise, at step 570, the protocol removes set C' from the disk drives of a primary module, stores data item d on disk in the vacated spot at step 580, and forwards d to the host controller at step 590. The protocol ends at step 595.

In addition to the protocols disclosed, the present invention employs dynamic data migration to maintain server performance as user access patterns change over time. A low-priority, non-real-time thread migrates data to new modules based on monitored access patterns, with the objective of evenly re-distributing popular data over all modules. A second low-priority non-real-time thread migrates data to new tracks on the same disk drives, also based on observed access patterns, with the objective of locating popular data on the faster outer tracks of disk drives. The difference in seek and transfer rates between the outer and inner tracks of a disk are substantial; for example, the internal transfer rate of a Seagate Cheetah disk varies from 152 Mbps on inner tracks to 231 Mbps on outer tracks, and the seek time can vary from 2 ms to 13 ms depending on how far away the next segment of data on the disk drive is. The movement of popular data by the second thread to faster tracks can therefore significantly increase disk bandwidth, and consequently, overall server performance.

Figure 6:
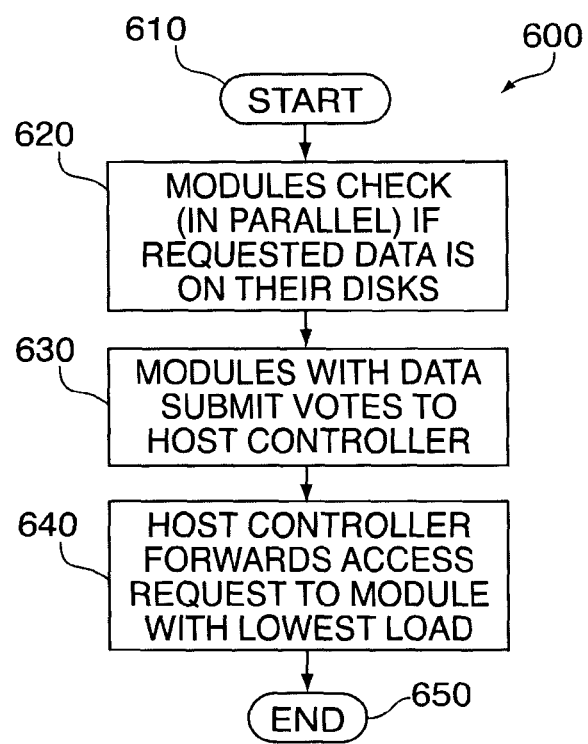
FIG. 6 depicts a flowchart specification of the Access Request Assignment Protocol.

In addition to data management, in a modular server architecture it is necessary to assign user access requests to modules, a task that is particularly important when the requested data item is located at multiple modules. This task is accomplished in the present invention by an Access Request Assignment Protocol that is performed by the host controller. The object of the protocol is to assign requests to modules such that outstanding user requests are evenly distributed among the module processors, thus resulting in steady-state module loads. The Access Request Assignment Protocol 600 is depicted as a flow diagram in FIG. 6. The protocol 600 is essentially a conventional voting algorithm (voting algorithms are well-known in the distributed system arts.) The process begins at step 610 and proceeds to step 620 wherein each of the module processors determines, in parallel, whether the requested data item is stored on its disk drive cluster. At step 630, all processors that have the requested data item submit a vote to the host controller and, at step 640, the host controller forwards the access request to the module with the lightest load. The protocol 600 ends at step 650.

After an access request has been forwarded to a module by the Access Request Assignment Protocol 600, the request waits in the module queue 260 for disk drive servicing. Since module loads may become uneven over time, the present invention employs an Access Request Migration Protocol which attempts to dynamically re-balance module loads by moving requests waiting for service from one module's queue to another module's queue. Of course, the protocol can only migrate a request to another module if the requested data item is replicated (i.e., another complete copy of the data is located on some other module disk cluster.)

The basic strategy of the Access Request Migration Protocol is to find the two modules in the server with the maximum and minimum loads, and attempt to migrate a user request from the maximum-loaded module queue to the minimum-loaded module. The protocol repeats this process periodically, running as a background thread.

Figure 7:
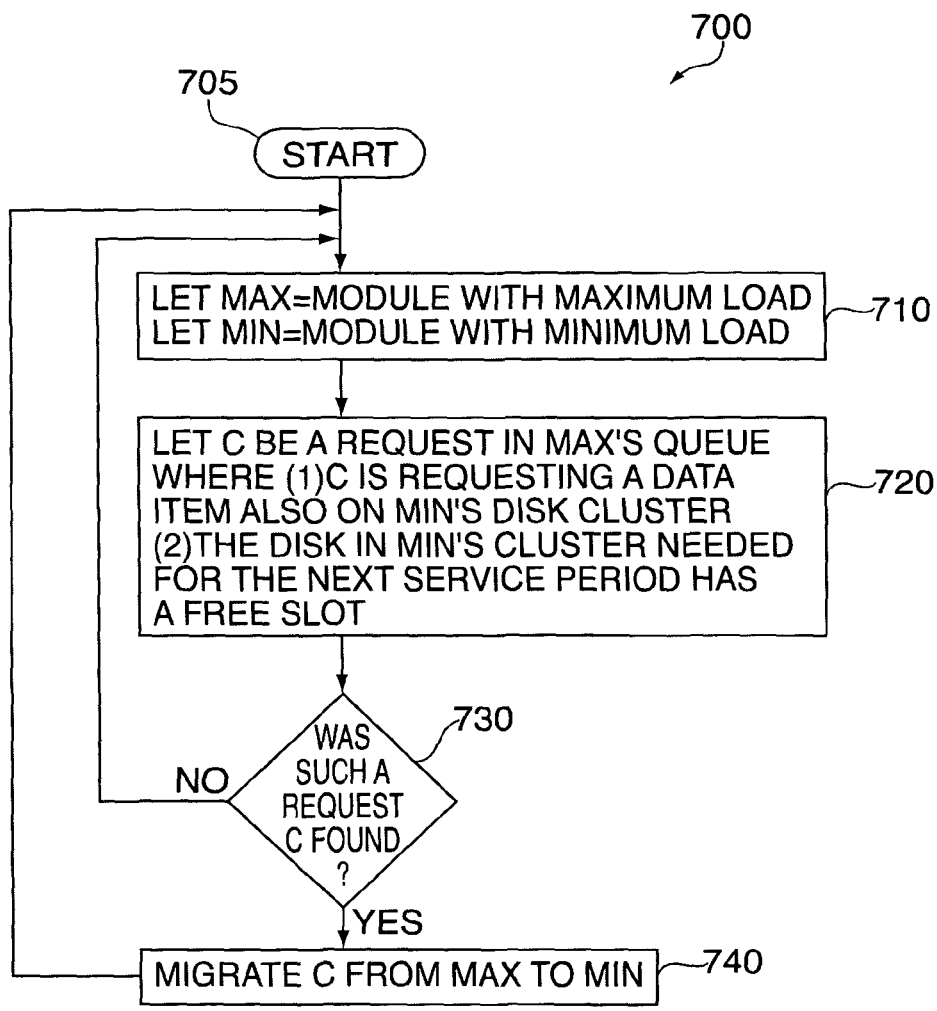
FIG. 7 depicts a flowchart specification of the Access Request Migration Protocol.

FIG. 7 depicts a flow diagram of the Access Request Migration Protocol 700. The protocol begins at step 705 and proceeds to step 710 wherein the protocol first finds MAX, the module with the largest load, and MIN, the module with the lightest load. The queue of outstanding requests in MAX's queue is then examined at step 720 to see if there is some request in the queue waiting to access a data item with another copy at MIN, such that the disk in MIN's cluster needed for the next service period has a free slot. If such a request is found, it is migrated at steps 730 and 740 from MAX to MIN). Optionally, in the case where multiple such requests are found, it is advantageous for the protocol to migrate the request for the largest data item (i.e., the data that will take longest to read from disk). This process is then repeated indefinitely, starting at step 710.

The foregoing discloses a detailed description of a modular architecture and data management methods for a general-purpose storage server. In video servers, there are a number of additional issues that arise due to the specific nature of video programs. In particular, it is advantageous to have the Data Initialization Protocol store only "leader tracks" containing the first few minutes of a movie on the disk drives, and then, once a movie has been requested for viewing, retrieve the remainder of the movie from secondary storage to the disk drives while the user is watching the leader track. This allows the video server to deliver a much larger volume of programs in real-time, rather than initially storing complete movies on the disk drives. As in the case of general-purpose data, leader tracks should be evenly distributed over the server modules, and when retrieving the remainder of a movie from secondary storage, it is not necessary to store the data at the same module at which the leader is located. Finally, in the Access Request Migration Protocol, if there are multiple outstanding request candidates in the maximum-loaded module, the optional selection procedure should choose the request for the movie with the longest remaining playing time and least recently manipulated, i.e., least recent use of fast forward, rewind and the like.

Figure 8:
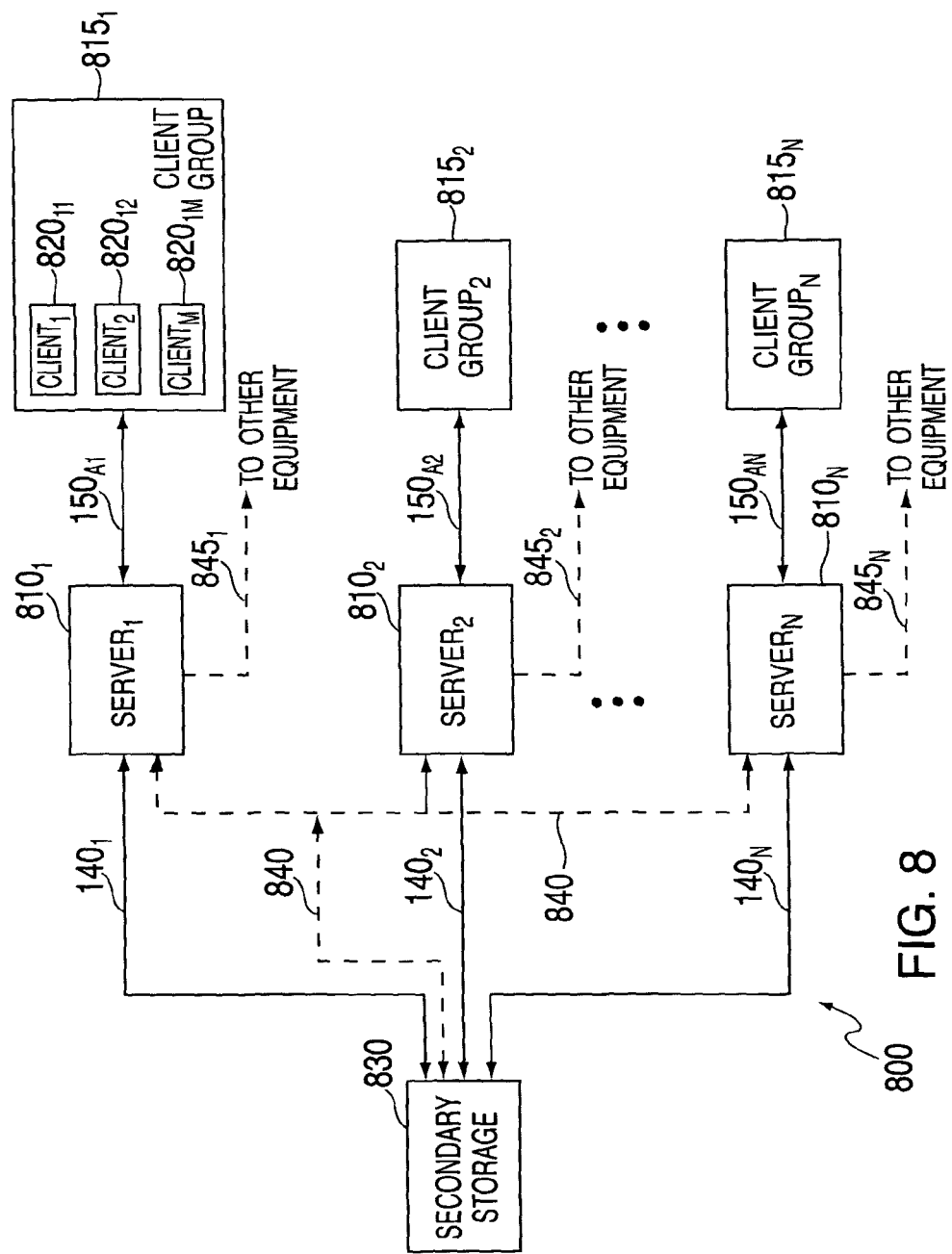
FIG. 8 depicts a high level block diagram of a data retrieval system including a plurality of storage servers.

FIG. 8 depicts a high level block diagram of a data retrieval system including a plurality of storage servers. Specifically, FIG. 8 depicts a client/server data retrieval system 800 that employs, illustratively, a plurality of storage servers $810_1$ through $810_N$ (collectively storage servers 810) to accept user data access requests from respective client groups $815_1$ through $815_N$ (collectively client groups 815). It is noted that each client group 815 comprises a plurality of clients, such as client $820_{11}$ through $820_{1M}$, which are shown in FIG. 8 as comprising client group $815_1$. Each server 810 communicates with its respective client group 815 via a respective bi-directional data path 150 (e.g., data paths $150_{A1}$ through $150_{AN}$). Each server 810 retrieves the client requested data from disk drives within the server and, when necessary, from a secondary storage device 830.

It is noted that secondary device 830 of FIG. 8 communicates with each of the servers $810_1$ through $810_N$ via a respective bi-directional data path $140_1$ through $140_N$.

The data retrieval system 800 of FIG. 8 is especially useful within the context of a networked secondary storage solution. The network implementing communications for such a secondary storage solution may comprise point-to-point links, an internet protocol (IP) network, a fiber channel network or any other network suitable for carrying high bandwidth traffic. Preferably, the quality of service (QoS) provided to a customer requesting content via data paths 150 is not dependent upon a particular QoS level within the network 140. That is, as long as the network 140 delivers content from the secondary storage device 830 to the appropriate server 810 in a timely manner, irrespective of QoS deficiencies, the server 810 will be able to stream the requested content to a requesting subscriber via a respective network 150 in a manner providing a high quality presentation of the requested content to the subscriber.

However, where a server 810 has insufficiently cached requested content, the QoS of the requested content will also depend upon the QoS of network 140. That is, the controller must operate within the quality of service (QoS) associated with the network, such as latency, packet jitter and/or loss and other QoS factors. Thus, in one embodiment, a server 810 requesting content from the secondary storage device 830 via a network 140 performs various processing functions to insure that any degradation induced by the QoS of network 140 is either compensated for or masked prior to the serving of a requested title to a client 820.

Various processing techniques or algorithms may be utilized by a server 810 to address latency issues and other issues. For example, in one embodiment a server 810 is preloaded with one or more portions of a title such that subscriber access latency to the title is minimized. In this embodiment of the invention, a server 810 includes, for example, an initial portion of a title, which is streamed to a client immediately upon receiving a request for the title from the client. Additionally, other preloaded portions such as initial portions of title chapters or scenes may be preloaded such that user requests for title access at a particular chapter or scene may be rapidly satisfied. Contemporaneous to the start of streaming a preloaded portion, the server 810 accesses the secondary storage device 830 via the network 140 to retrieve the remaining portion of the title. In this manner, the server 810 operates as a caching server for at least the remaining portion of the title. Advantageously, the present invention operates to selectively provide push and/or pull provisioning techniques to control the type and/or amount of content stored within the servers 810.

In one embodiment, a title from the secondary storage unit 830 is loaded at a location other than the start of the title or other asset, such that latency to a particular portion of the title or other asset is minimized. That is, a title or other asset is loaded in a manner providing one or more entry points to the title or asset other than an initial entry point. Each of the one or more entry points comprises a portion of the title that may be accessed rapidly. For example, in the case of a title divided into a plurality of chapters such as used in digital versatile disks (DVD) storage media, a title loaded onto the secondary server may be loaded as a plurality of chapters, where each chapter may be rapidly entered (i.e., retrieved) based on client requests. This random entry of predefined portions of a title helps reduce latency. By storing several portions of an asset within a server 810, where the stored portions are proximate logical play track or content entry points (i.e., chapter points or scene change points), the server 810 is more likely to be able to immediately satisfy a customer request.

In one embodiment, a video reservation method is implemented. In this embodiment, a client request for a particular title or other asset is queued by the corresponding server 810. The server 810 retrieves the requested title or other asset from the secondary storage device 830 via the network 140. When the requested title or other asset is retrieved, a notification is sent to the client that the requested title or asset is available for delivery and presentation to the client.

In one embodiment, a preview, promotion or advertisement is used to mask latency associated with the transfer of a title or other asset from the secondary storage 830 to the server 810. In this embodiment, various "eye candy" is presented to a client while a client request is processed by the server. It is noted that further refinement of this embodiment is allowing a client to skip the preview, promotion or advertisement in the case of the title or requested asset having at least an initial portion preloaded on the server, as discussed above.

The secondary storage interconnect network 140 has associated with it various capacity and QoS parameters, while title or asset availability depends upon the provisioning of secondary storage 830 and the server 810 serving a particular client. These parameters heavily influence the time required to acquire a title, product or other asset stored in secondary storage 830. As such, the close controller within server 810 (or other controllers within the data retrieval system operating to satisfy a client request) must evaluate provisioning, QoS and/or bandwidth availability information to responsively determine an appropriate latency masking and/or client message strategy. In each instance, the goal is to enhance the client-side interaction experience. This experience is enhanced by timely providing requested content, by masking latency associated with satisfying such requests, by directing appropriate promotional material to clients and/or by providing pre-loaded content or content portions on the server 180 or random access to appropriate entry points within content titles.

In one embodiment, a server 810 requiring content to satisfy a user request retrieves the required content from the secondary storage device 830 or, optionally, from another storage server 810. Content may be transferred between storage servers 810 via the secondary storage device 830 using the network 140. Optionally, a second or auxiliary network 840 connecting one or more of the storage servers 810 is provided for this purpose. The auxiliary network 840 optionally includes connectivity with the secondary storage device 830. The auxiliary network 840 is especially useful where two storage servers 810 are used to store respective portions of available content, such that each storage server 810 operates as a secondary storage device with respect to a portion of available content. Optionally, each server $810_1$ through $810_N$ has associated with it a respective network connection $845_1$ through $845_N$ used to connect the storage server to other equipment (not shown). Such other equipment may comprise local area network (LAN), wide area network (WAN), additional secondary and/or primary storage devices and the like. Essentially, each storage server 810 may be used to provide additional services and/or coordinate with other equipment.

The above-described embodiments are associated with a managed server storage model, in which the service operator and server demand determine the provisioning of content, either wholly or in part, within secondary and/or primary server modules.

The inventors have determined that for some applications a demand storage model is appropriate. A demand storage model of managing content may comprise, for example, a push model and a pull model. A pull model is where provisioning is adapted in response to client demand. A push model is where provisioning is adapted to storage and/or bandwidth availability, along with decisions regarding specific content to be promoted. As an example of a push model, a push from the server 830 to the caches 810 may be selected using service decisions made by programming personnel, as well as service decisions based upon aggregate purchasing behavior of network customers as evaluated against the characteristics of the asset(s) to be pushed. The total bandwidth usage of the network 140 may be minimized by using a broadcast (i.e., a multi-cast) model for the push implementation. In this case, illustratively all servers 810 receive the push content but each server implements a level of filtering of received content according to a server-specific evaluation of the importance of the pushed content made according to the needs and/or preferences of the subtended customers associated with the respective server 810. Thus, content pushed from secondary storage 830 to the servers 810 is blended with pull criteria based upon client groups 815 served by respective servers 810.

Within the context of the storage server 800 of FIG. 8, or any server network comprising secondary storage communicating with multiple streaming servers, optimal provisioning and other data management functions may be realized by balancing push and pull methodologies within a demand storage model.

Storage Management

Within the concept of data retrieval systems utilizing primary and secondary storage (especially where high bandwidth information such as video information is stored), it is important to efficiently store and delete content from at least the primary storage devices. For purposes of this discussion, all content titles are primarily stored in secondary storage and a demand pull algorithm is used to decide when to bring a product, title and/or asset to a primary storage device, such as a streaming server. The following definitions are applied: A "product" is a subscriber purchasable item, such as a movie, package of movies, subscription and the like. Products are defined by meta data which includes description, price, discount rules and the like. Products contain assets such as the play track of a movie, fast play and fast reverse tracks, navigation related assets such as navigation screens, promotional videos and the like.

Information associated with a product comprises at least product rights (or information) enabling a host controller to determine what a customer may do with a particular product, such as viewing time, use time, price, purchase rules, encryption methodologies and the like. A "title" is a viewable entity, such as a movie, a television episode and the like. An "asset" is an elementary component of a title or product, such as an MPEG play track, a preview track, a JPEG still image associated with a title, fast forward and/or rewind tracks and the like.

Products are typically stored on secondary storage by either the network operator or third party program providers. The availability of such stored products is "published" to the application servers that present a user interface to the customers. The products become elements of the overall user interface, either as on screen graphical or video imagery or web page information. Methods and apparatus for providing such on-screen graphical or video imagery within the context of a user interface are disclosed in U.S. Pat. No. 6,208,335, granted on Mar. 27, 2001 and incorporated herein by reference in its entirety.

When a customer or a client requests a product that is not currently resident on the respective storage server or primary storage device, the host controller must retrieve the product definition of the requested product, which will provide, inter alia, a list of titles or products comprising the requested product. The product definition allows the application server to adapt the presented user interface of a customer to achieve a next level of selection, where a list of titles is presented to the customer for final title selection.

Figure 9:
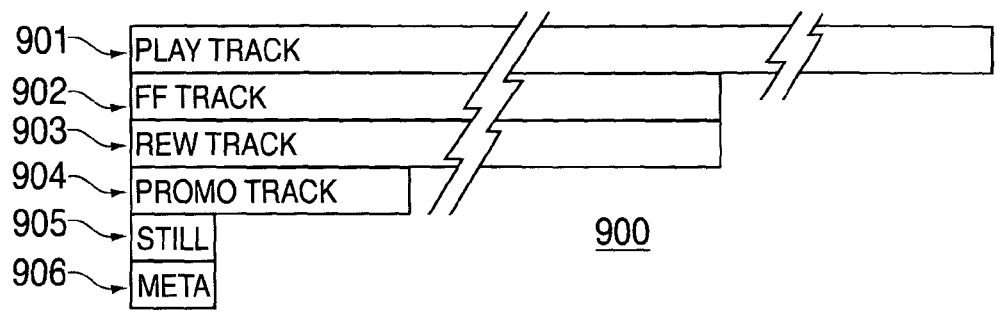
FIG. 9 depicts a graphical representation of a plurality of assets forming a title.

FIG. 9 depicts a graphical representation of a plurality of assets forming a title. Specifically, the exemplary title 900 of FIG. 9 comprises a play track 901, a fast forward track 902, a rewind track 903, a promotional track 904, a still image 905 and meta data (i.e., data related to the title or product) 906. It is noted that the relative sizes of the various tracks and other asset elements are not to scale. However, it is noted that the amount of disk space required to store the play track 901 is significantly greater than the amount of space required to store the fast forward track 902 or rewind track 903. Moreover, the amount of disk space required to store the fast forward/rewind tracks is significantly greater (typically) than the amount of time required to store the promotional track 904. The still imagery 905 and meta data 906 require even less memory to store. As such, multi-level caching preferably favors the removal of high storage requirement assets, such as play tracks and FF/REW tracks, prior to the removal of other assets. As an example, a 100 minute movie encoded at 4 megabits per second results in, approximately, 3 gigabytes of data. Depending upon the speed of the trick play tracks, the FF/REW tracks comprise approximately 20% of the total file size. The preview track comprises, typically, 60 megabytes of data. The majority of the three gigabyte file is occupied by the play track.

To provide information sufficient to enable a customer to select an individual title, a subset of the assets associated with the various titles may be provided. For example, in one embodiment, a promotional track is streamed in response to user interaction with an interactive program guide. Optionally, still imagery associated with a potentially selected title may be provided. JPEG files and meta data that describe individual titles may be used to create electronic program guide screens which are presented to a subscriber via the subscriber's presentation or display device. These screens may be presented as video information or as web pages, such as HTML pages. A customer may choose to view a promotional or preview track of a title or product, in which case the server will retrieve the appropriate promotional track from a secondary storage device or from the primary storage server devices.

It is important to note that the storage on a primary storage server is generally much less than the storage within a secondary storage device. As such, the host controller must actively manage the server storage to insure a high quality interactive experience for each of the subscribers within the system. Storage management functionality within the context of the present invention includes a number of elements, such as:

Complete titles as well as the individual assets forming complete titles are individually managed. Thus, when a product is first published the promotional information and meta data (e.g., usage rules) are retrieved and stored in primary storage. Some of the information related to the individual titles, such as JPEG files or other still imagery, may be stored in primary storage such that latency is reduced to a user interacting via an interactive program guide.

Where elements of the product are expected to be frequently viewed, such elements may also be retrieved and stored in a primary storage device. As previously discussed, a push method may be used to distribute the various assets associated with a product. For example, when a product is first published and heavily promoted, preview information associated with individual titles may be retrieved from secondary storage and stored within primary storage prior to customer requests. Additionally, information published with the product, such as Motion Picture Association of America (MPAA) ratings or other ratings may also be placed in primary storage as meta data. Such information is useful in enabling subscribers to select appropriate content.

Storage management algorithms according to the invention adapt to the usage pattern of customers, the storage requirements and/or capacity of the primary and secondary storage devices, and the expected demand for content.

In this method, the controller waits for new products to be published. Product meta data may be retrieved (not shown) and, from that meta data, decisions are made by the controller regarding the assets to be transferred. For example, product promotional assets are always transferred, since these assets are generally required for a customer to access the product. Thus, if no space is available in a storage server, space will be made for at least the promotional assets. A decision is then made to transfer titles and assets that may be frequently requested, though these assets are only transferred if space is available. Otherwise, this requirement is queued to be rechecked at a future time. In transferring frequently used titles and assets, the actual transfers will depend upon the available space within the storage server. A space management method will be described in more detail below with respect to FIG. 11.

Figure 10:
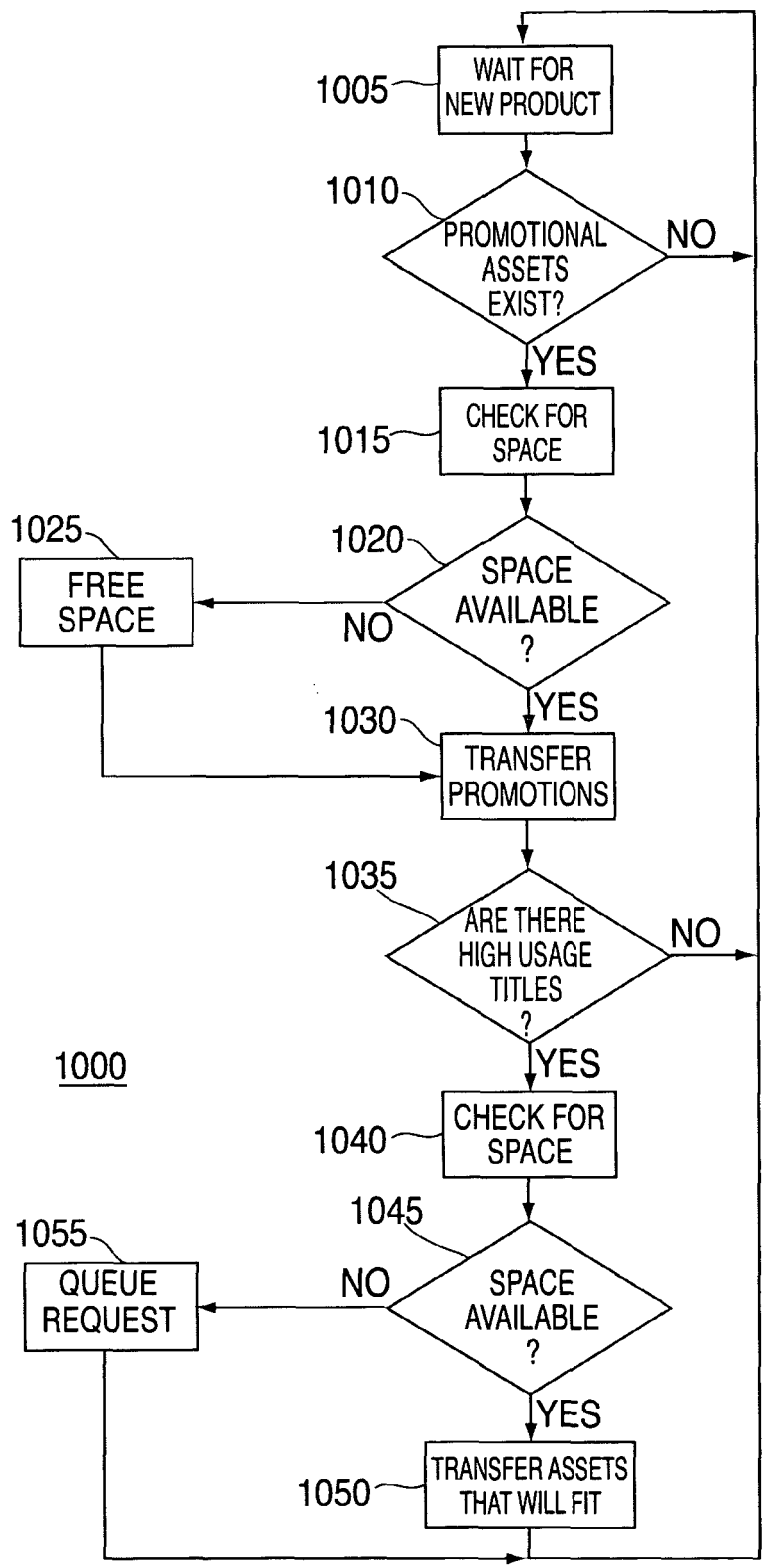
FIG. 10 depicts a flow diagram of a method for managing the publication of new products.

FIG. 10 depicts a flow diagram of a method for managing the publication of new products. The method 1000 of FIG. 10 is suitable for use in, for example, a controller (such as the host controller 210 of FIG. 2) operating with a server (such as the servers 110 or 810 of FIGS. 1 and 8).

The method 1000 is entered at step 1005 where the controller waits for new product. Upon receiving new product, a query is made at step 1010 as to whether any promotional assets exist in the new product. If no promotional assets exist, the method 1000 returns to step 1005. If promotional assets exist, then a determination is made at steps 1015 and 1020 as to whether space on the storage server 110/810 is available. If space is not available, then at step 1025 sufficient space within the storage server is freed or released.

At step 1030, the promotional assets associated with the new product are transferred to the existing (or newly released) space on the storage server. At step 1035, a query is made as to whether any high usage titles are included with the new product. If no high usage titles are included, then the method 1000 returns to step 1005 to await further new products. If high usage titles are included, then at step 1040 a determination is made as to whether sufficient space is available to store the high usage titles. At step 1045, a query is made as to whether the determination at step 1040 indicates that sufficient space is available. If available, at step 1050 the assets that will fit are transferred to the storage server. Otherwise, a request for the high usage title assets is placed in a request queue. The method 1000 then returns to step 1005.

Figure 11:
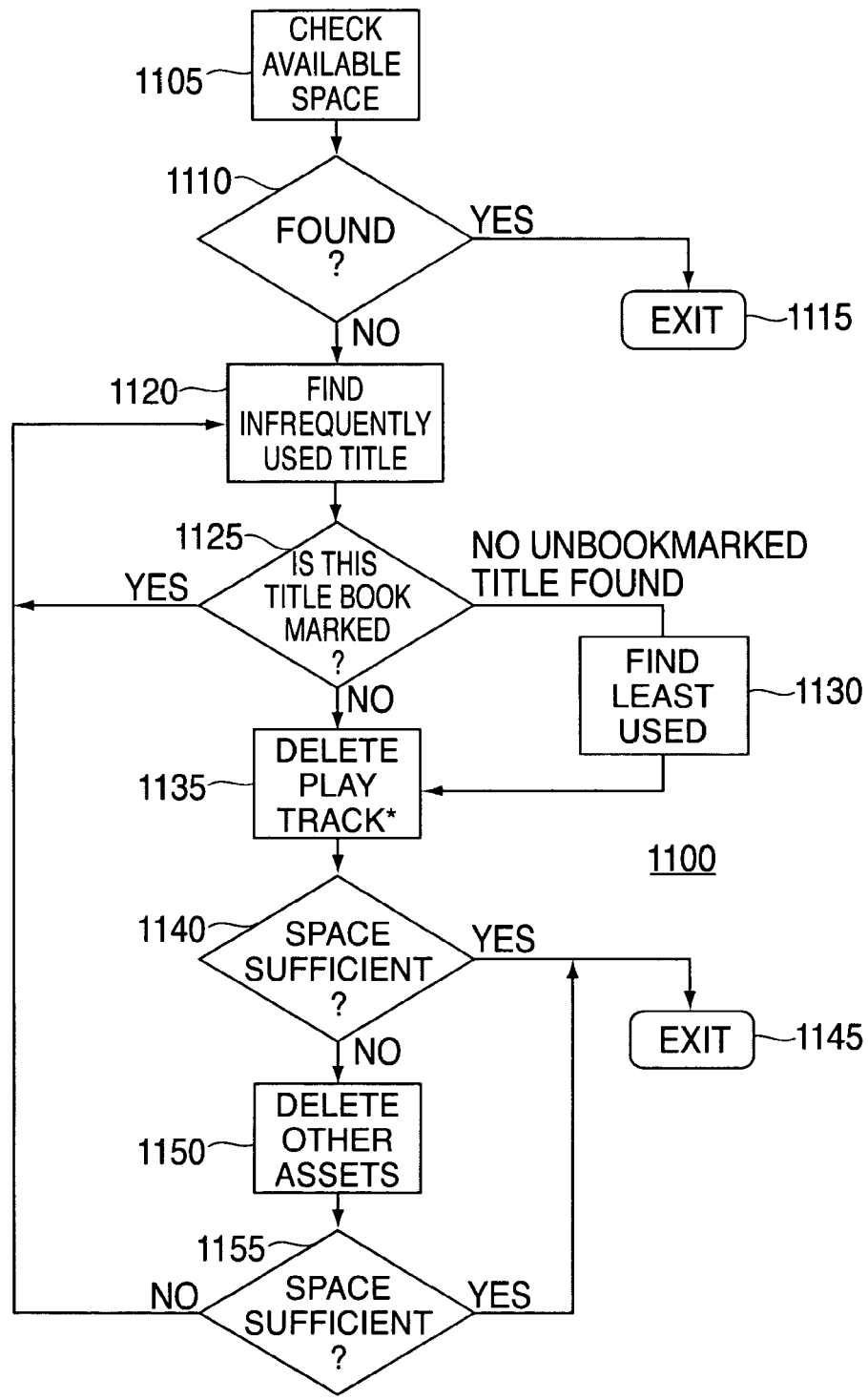
FIG. 11 depicts a flow diagram of a method for managing server space.

FIG. 11 depicts a flow diagram of a method for managing server space. The space management method 1100 of FIG. 11 is suitable for use in, for example, a controller (such as the host controller 210 of FIG. 2) operating with a server (such as the storage servers 110 of FIG. 1 or 810 of FIG. 8). The space management algorithm 1100 takes into account the need to minimize the time to restore a title and provide full VOD capability. The flow diagram depicts some of the considerations, such as not deleting bookmarked titles, deleting the play track first and the like. Other modifications to the method 1100 of FIG. 11 include deleting the end of a play track before deleting an entire play track and other modifications.

At step 1105, the available space within the storage server to be managed is checked. At step 1110, a query is made as to whether sufficient space to store the assets associated with a product or title has been found. If sufficient space has been found, the method 1100 exits at step 1115.

If sufficient space has not been found at step 1110, then at least one infrequently used title is found at step 1120. At step 1125, a query is made as to whether the title found at step 1120 has been bookmarked. If the infrequently used title of step 1120 has been bookmarked, then the method 1100 proceeds to step 1120 where the next infrequently used title is found. The method iterates through this loop until an infrequently used title that has not been bookmarked is found, at which point the method 1100 proceeds to step 1135. If no unbookmarked title is found (i.e., bookmarked titles are not deleted) then the method 1100 proceeds to step 1130, where the title least used or requested by subscribers is identified.

At step 1135, at least a portion of the play track of the non-bookmarked infrequently used title (or the least used title) is deleted. As previously noted, the play track of a title comprises the video and associated audio information associated with the title, and is the largest single asset associated with the title. In one embodiment, only those portions of the play track not proximate chapter entry points and/or scene change points are deleted. In this manner, customer requests for the entry into a play track at typical chapter entry points may be rapidly satisfied. Such requests will be discussed in more detail below with respect to step 1235 in the method 1200 of FIG. 12. The method 1100 then proceeds to step 1140.

At step 1140, a query is made as to whether the remaining free space is sufficient to store a desired title. If the available space is sufficient, then the method 1100 exits at step 1145. Otherwise, other assets associated with the infrequently used title (or least used title) are deleted at step 1150. At step 1155, a determination is made as to whether the available space is now sufficient to store the desired title. If sufficient space is available, then the method 1100 exits at step 1145. If the space is insufficient, then the method 1100 performs the above steps beginning with step 1120 to free up additional space within the server. It is noted that where a bookmarked title is found that the play track of the bookmarked title may be partially deleted to free space.

Service Management/Asset Retrieval

Within the context of the present invention, the storage management methodologies employed to effect efficient video asset caching are adapted in response to service considerations. That is, the retention or deletion of assets associated with products and/or titles depends upon the need to provide access to new titles or products as well as the need to avoid the expense of storing infrequently used or otherwise less necessary titles and products on a primary storage device. To achieve appropriate service levels for customers or subscribers within the system, it is necessary to transfer video assets from secondary storage to primary storage prior to streaming the video assets to a customer. Within the context of video assets including play tracks, fast forward tracks, fast reverse tracks, bookmark or chapter entry points and the like, this transfer must be intelligently handled. In one embodiment, the transfer of video assets from secondary to primary storage occurs prior to any streaming of the video assets to a requesting subscriber. Unfortunately, this results in a relatively high degree of latency. To avoid such latency, a smart retrieval method will now be described with respect to FIG. 1.

Figure 12:
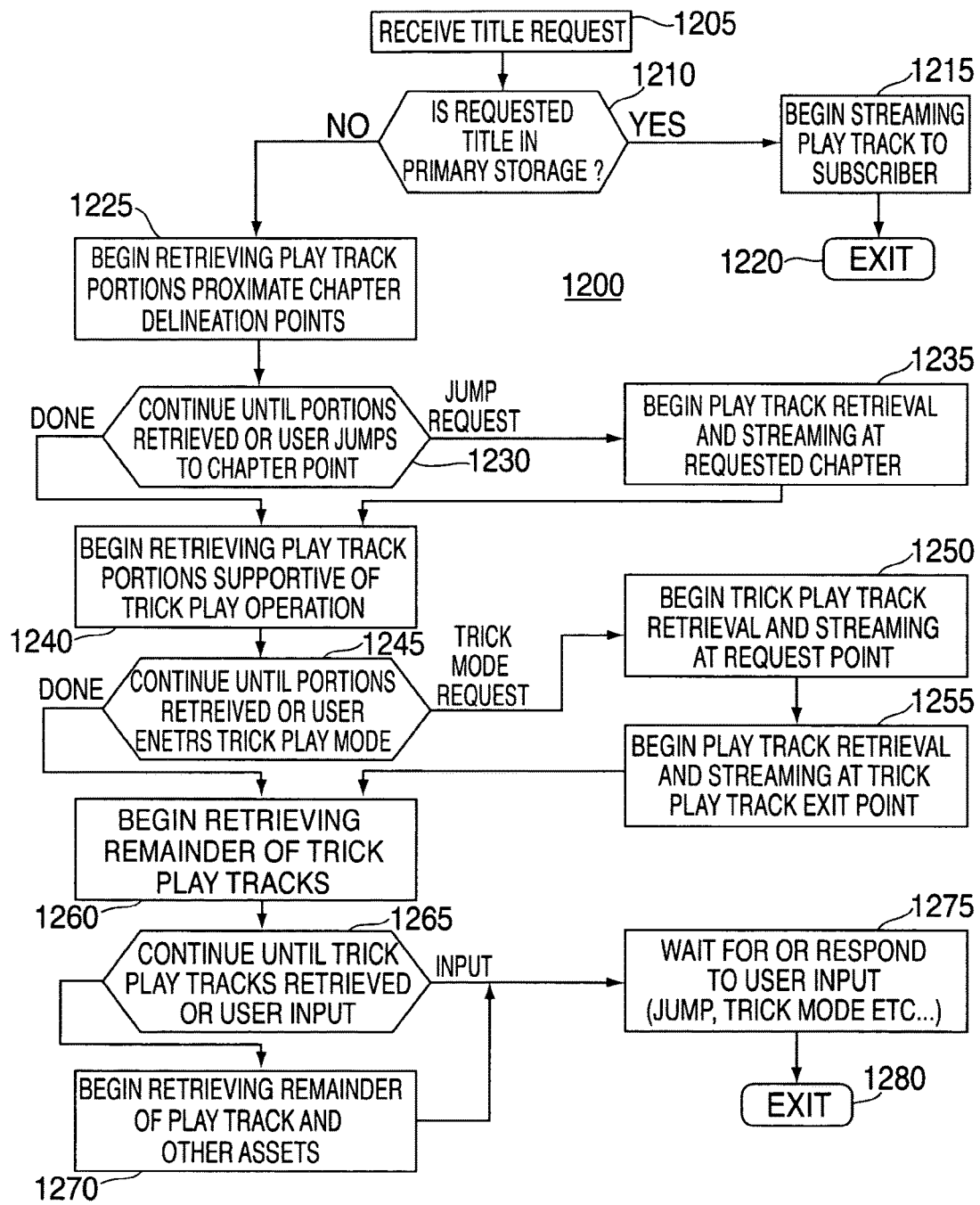
FIG. 12 depicts a flow diagram of an asset retrieval method suitable for use in an information distribution system utilizing primary and secondary storage To facilitate understanding, identical reference numerals have been used, where possible, to designate identical elements that are common to the figures.

FIG. 12 depicts a flow diagram of an asset retrieval method suitable for use in an information distribution system utilizing primary and secondary storage, such as for the distribution of video information. Specifically, the method 1200 of FIG. 12 is especially useful within the context of titles or products comprising a plurality of video assets, such as described above with respect to FIG. 9.

The method 1200 of FIG. 12 is entered at step 1205 when a controller executing the method receives a title request. At step 1210, a query is made as to whether the requested title is resident within a primary storage device associated with a requesting user or subscriber. If the requested title is resident, then at step 1215 the primary storage device begins streaming the play track of the requested title to the requesting subscriber. Optionally, a promotional track or other asset associated with the requested title is provided to the subscriber. The method 1200 then exits at step 1220. It is noted that further user interactions requiring the streaming of fast forward/rewind or other trick play tracks are handled in the manner previously described above with respect to FIGS. 1-8.

If at step 1210 it is determined that the requested title is not resident with the primary storage, then at step 1225 the controller begins retrieving portions of the play track proximate chapter delineation points. That is, at step 1225, where a play track is divided into chapters or segments, such as chapters commonly found on digital versatile disk (DVD) media, several blocks or portions of the play track near each chapter point are retrieved prior to the retrieval of the remainder of the play track. In this manner, if a customer chooses to "jump" to a chapter point, at least some of the play track proximate that chapter point will be available for presentation, thereby reducing the latency experienced by the user.

At step 1230, the play track retrieval continues until all the portions proximate chapter delineation points are retrieved or until a user interaction indicates a request to jump to the presentation of retrieved content at a chapter point. If a jump request is received, then at step 1235 the retrieved play track is streamed to the user beginning at the requested chapter. Additionally, the controller causes the play track to be retrieved from the secondary storage device beginning with the play track portions necessary to provide the requested chapter and subsequent chapters in the title or product. The method 1200 then proceeds to step 1240. When the play track portions proximate chapter delineation points have been retrieved (per step 1230) or when at least the requested chapter play track has been retrieved (per step 1235), at step 1240 the controller begins retrieving play track portions supportive of trick play operation. Specifically, portions of the play track are associated with respective portions of trick play tracks, such as fast forward or fast rewind tracks. Transitions between play and trick play tracks are supported using indexing information, whereby streaming and presentation of a play track results in the advancement of an index associated with the play track, the index having a trick play index counterpart indicating the entry point into a trick play track should a user request fast forward or rewind of a currently streamed play track. Thus, given a play track being streamed to a user, it is desirable to retrieve from secondary storage at least portions of trick play tracks associated with presently streamed play track portions.

At step 1245, the retrieval of play track portions supportive of trick play operation is continued until play track portions capable of supporting at least limited trick play transitions have been retrieved or the user enters a trick play mode.

At step 1245, if the user requests a trick play mode, then the method proceeds to step 1250 where the controller begins retrieving the appropriate trick play track (i.e., FF or REW) from the secondary storage device and streaming the trick play track to the user beginning at the requested entry point. At step 1255, when the user exits the trick play mode, the controller begins retrieving play track data and streaming the retrieved play track data at the play track entry point associated with the trick play track exit point. The method 1200 then proceeds to step 1260.

At step 1260, the controller begins retrieving the remaining portions of the trick play tracks from the secondary storage device. At step 1265, the trick play track retrieval continues until all the trick play tracks have been retrieved or until user input is received. Upon retrieval of all the trick play tracks from the secondary storage device, the controller begins retrieving the remainder of the play track and any other assets not yet retrieved at step 1270.

At step 1275, the controller waits for (or responds to) user input, such as a jump request, a trick play mode entry or exit request and the like. The method 1200 exits at step 1280.

Within the context of the present invention, it is contemplated that fast play and fast reverse play tracks are utilized in which compressed video streams (e.g., MPEG or other compression schemes) including intracoded frames (I-frames), forward predictively coded frames (i.e., P-frames) and/or bidirectionally predicted frames (i.e., B-frames) are utilized. In this manner, a predefined presentation speed ratio may be established between the play track and the trick play tracks, illustratively a 1×9 ratio. It is noted that in the case of trick play tracks providing a 9× speed increase with respect to standard play tracks that the amount of time required to retrieve a quick play track form a secondary storage device is approximately one fifth of the time required to retrieve the play track from the secondary storage device. Using the method 1200 of FIG. 12, where selected blocks of the play track (e.g. less than 5% of the total play track) are retrieved, the latency experienced by a subscriber is greatly reduced. It is noted that the blocks retrieved at step 1225 represent approximately 5% of the total play track blocks. These blocks are preferably equally spaced throughout the play track, each block containing at least one complete group of pictures (GOP).

In one embodiment of the invention, imagery displayed upon the user's display device comprises a "progress bar," which serves to graphically represent the relative presentation position of a presently viewed play or quick play track. The progress bar represents the beginning of a title on one end and the end of the title on another end, with a marker therebetween indicating a relative temporal presentation distance between the beginning and end portions of the title or product. In one embodiment of the invention, control information is received from the subscriber indicative of subscriber selection of a portion of the control bar, the portion of the control bar being translated by the server module controller into a segment identification or chapter point, at which time the controller causes the streaming of content from that point in either a play mode or trick play mode.

The method 1200 of FIG. 12 advantageously minimizes the latency experienced by a user within an interactive information distribution system by selectively retrieving portions of a title or product from a secondary storage device in a manner calculated to meet user expectations. In one embodiment of the invention, one or more of the play and trick play tracks are stored in the secondary storage device multiple times at respective multiple quality levels. It is known that the amount of data required to represent video at a relatively coarse quality level is less than the amount of data required to represent the same video at a relatively high quality level, where quality is defined in terms of spatial and/or temporal resolution. It is also noted that the above-described teachings with respect to video tracks may also be applied to audio tracks associated with the video tracks. However, since the amount of information typically required to represent audio is far less than the amount of information required to represent corresponding video, such processing of audio tracks is typically unnecessary, though such processing is contemplated by the inventors within the context of the present invention.

In one embodiment of the invention, the secondary storage device 830 of FIG. 8 may operate as a primary storage device. Thus, where the secondary storage device 830 operates as a primary storage device (such as a storage device 810), the primary storage device operations described above with respect to storage device 810 and FIGS. 8-12 are applicable to at least a subset of the secondary storage device 830 operations.

While this invention has been particularly shown and described with references to a preferred embodiment thereof, it will be understood by those skilled in the art that various changes in form and details may be made therein without departing from the spirit and scope of the invention as defined by the appended claims.

What is claimed is:

1. A method comprising:
storing, at a computing device, an initial portion of a first segment of a plurality of segments of a media content item and an initial portion of a second segment of the plurality of segments of the media content item, wherein the first segment occurs prior to the second segment of the media content item; and
after the storing and in response to receiving a request for the media content item from a device,
causing the initial portion of the first segment of the media content item to be provided to the device from the computing device; and
causing a remaining portion of the first segment of the media content item to be provided to the device from a secondary storage device.

2. The method of claim 1, further comprising:
storing, at the computing device, an initial portion of each segment of a plurality of segments of a different media content item;
causing the initial portion of a segment, of the plurality of segments of the different media content item, to be provided to the device from the computing device; and
causing a remaining portion of the segment of the different media content item to be provided to the device from the secondary storage device.

3. The method of claim 2, wherein the segment of the different media content item is a segment other than an initial segment of the plurality of segments of the different media content item.

4. The method of claim 1, further comprising:
prior to the storing the initial portion of the first segment of the media content item, maintaining, at the computing device, storage of an initial portion of a different media content item and removing a remaining portion of the different media content item from the computing device.

5. The method of claim 1, further comprising:
prior to the storing the initial portion of the first segment of the media content item, maintaining, at the computing device, storage of an initial portion of each segment of a plurality of segments of a different media content item and removing a remaining portion of each segment of the plurality of segments of the different media content item from the computing device.

6. The method of claim 1, further comprising:
receiving requests for a plurality of different media content items from a plurality of devices;
based on the requests, determining which media content items of a library stored in the secondary storage device are most likely to be requested by the plurality of devices;
removing, from the computing device, one or more media content items not determined most likely to be requested by the plurality of devices;
retrieving from the secondary storage device each initial portion of one or more media content items determined most likely to be requested by the plurality of devices; and storing, at the computing device, each initial portion of the one or more media content items determined most likely to be requested by the plurality of devices.

7. The method of claim 6, further comprising:
determining that a particular media content item is ineligible for removal from the computing device while the particular media content item is being read, retrieved, migrated, or replicated.

8. The method of claim 1, wherein the initial portion of the second segment is configured to be longer than a latency in providing a remaining portion of the second segment of the media content item to the device.

9. A method comprising:
storing, by a computing device, an initial portion of each segment of a plurality of segments of a media content item, wherein a first segment of the plurality of segments occurs prior to an initial portion of a second segment of the plurality of segments of the media content item; and
after the storing and in response to receiving a request for the first segment of the plurality of segments from a device,
causing the initial portion of the first segment to be provided to the device from the computing device; and
causing a remaining portion of the first segment to be provided to the device from a secondary storage device separate from the computing device.

10. The method of claim 9, wherein the first segment is a segment other than an initial segment of the plurality of segments of the media content item.

11. The method of claim 9, further comprising:
prior to the storing the initial portion of each segment of the plurality of segments of the media content item, maintaining, at the computing device, storage of an initial portion of a different media content item and removing a remaining portion of the different media content item from the computing device.

12. The method of claim 9, further comprising:
prior to the storing the initial portion of each segment of the plurality of segments of the media content item, maintaining, at the computing device, storage of an initial portion of each segment of a plurality of segments of a different media content item and removing a remaining portion of each segment of the plurality of segments of the different media content item from the computing device.

13. The method of claim 9, further comprising:
determining that a set of media content items are likely to be requested based on a usage pattern of a plurality of devices; and
storing, at the computing device, an initial portion of each media content item of the set of media content items.

14. A method comprising:
storing, at a computing device, an initial portion of a first media content item;
removing, at the computing device, a remaining portion of the first media content item;
after the removing, storing, at the computing device, an initial portion of each segment of a plurality of segments of a second media content item, wherein a first segment of the plurality of segments occurs prior to an initial portion of a second segment of the plurality of segments of the second media content item; and
after the storing the initial portion of each segment of the plurality of segments of the second media content item and in response to receiving a request for the first segment of the plurality of segments of the second media content item from a device,
causing the initial portion of the first segment of the second media content item to be provided to the device from the computing device; and
causing a remaining portion of the first segment of the second media content item to be provided to the device from a secondary storage device separate from the computing device.

15. The method of claim 14, further comprising:
storing, at the computing device, an initial portion of each segment of a plurality of segments of a third media content item;
in response to receiving a request for a particular segment of the plurality of segments of the third media content item from the device, causing the initial portion of the particular segment to be provided to the device from the computing device; and
causing a remaining portion of the particular segment to be provided to the device from the secondary storage device.

16. The method of claim 14, further comprising:
maintaining, at the computing device, storage of an initial portion of each segment of a plurality of segments of a third media content item and removing a remaining portion of each segment of the plurality of segments of the third media content item from the computing device.

17. The method of claim 14, wherein the remaining portion of the first segment of the second media content item is provided to the device from the secondary storage device without storing the remaining portion of the first segment of the second media content item in a storage component of the computing device.

18. The method of claim 1, further comprising:
after the storing and in response to receiving a request for the second segment of the media content item from the device,
causing the initial portion of the second segment of the media content item to be provided to the device from the computing device; and
causing a remaining portion of the second segment of the media content item to be provided to the device from the secondary storage device.

19. The method of claim 9, further comprising:
after the storing and in response to receiving a request for the second segment of the media content item from the device,
causing the initial portion of the second segment of the media content item to be provided to the device from the computing device; and
causing a remaining portion of the second segment of the media content item to be provided to the device from the secondary storage device.

20. The method of claim 14, further comprising:
after the storing and in response to receiving a request for the second segment of the second media content item from the device,
causing the initial portion of the second segment of the second media content item to be provided to the device from the computing device; and
causing a remaining portion of the second segment of the second media content item to be provided to the device from the secondary storage device.

* * * * *